Dec. 13, 1966  E. W. WHITE  3,291,717
HYDROGENATION OF BITUMINOUS EMULSION OBTAINED FROM TAR SAND
Filed Dec. 9, 1963
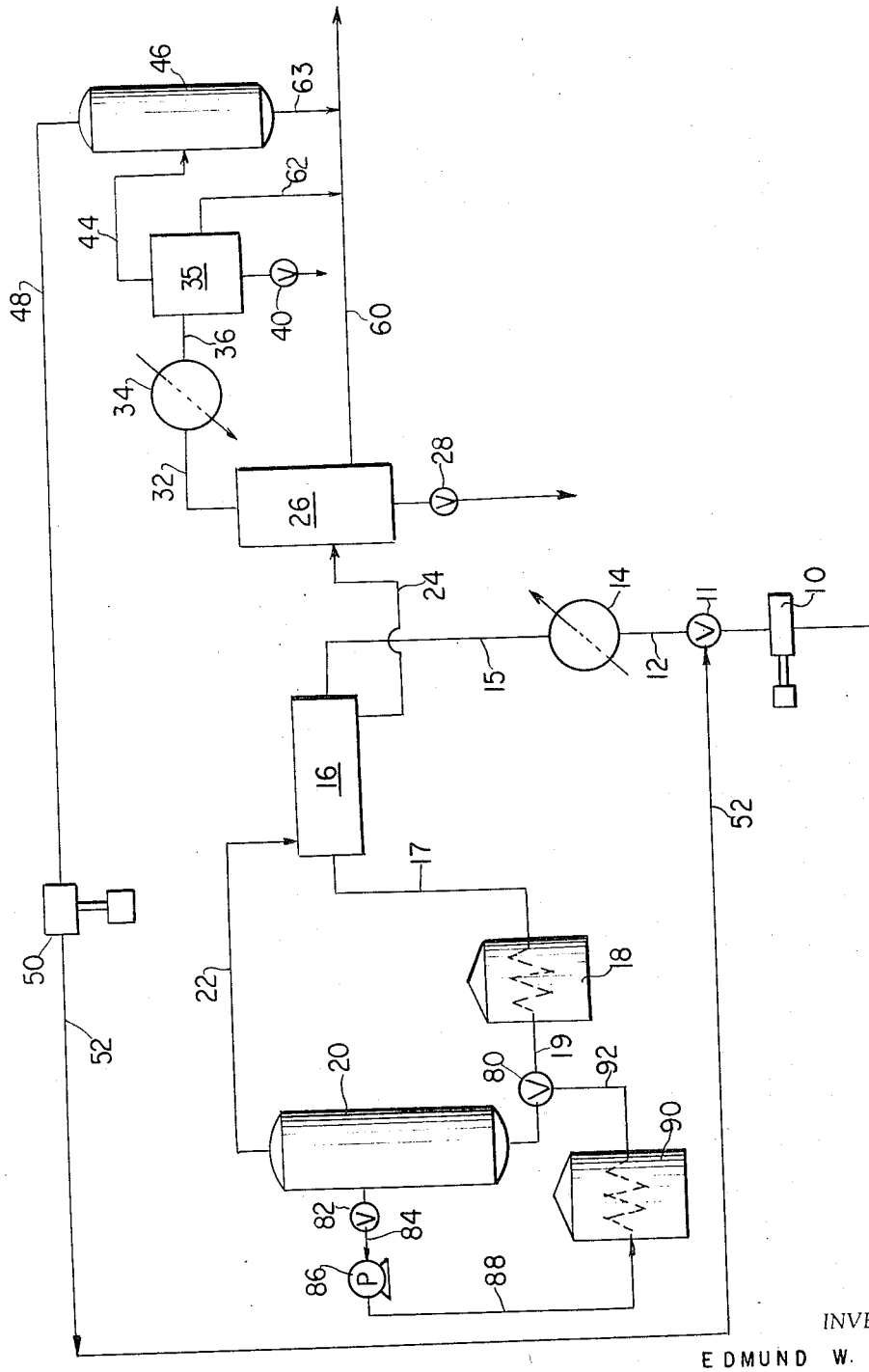
INVENTOR.
EDMUND W. WHITE
BY William F. Lilliam
ATTORNEY United States Patent Office 3,291,717
Patented Dec. 13, 1966

3,291,717
HYDROGENATION OF BITUMINOUS EMULSION
OBTAINED FROM TAR SAND
Edmund W. White, Edmonton, Alberta, Canada, assignor, by direct and mesne assignments, of thirty percent to Cities Service Athabasca, Inc., Edmonton, Alberta, Canada, a corporation of Delaware, thirty percent to Imperial Oil Limited, thirty percent to Atlantic Richfield Company, and ten percent to Royalite Oil Company Limited
Filed Dec. 9, 1963, Ser. No. 328,811
8 Claims. (Cl. 208—11)

This invention relates to the separation of oil from bituminous emulsions. More particularly this invention relates to a method for separating oil from a bituminous emulsion obtained by admixing water with bituminous sand in order to separate the bitumen from coarse sand particles. Broadly, the separation of oil from the emulsion is effected by hydrogenating the bituminuous emulsion.

Large deposits of bituminous sand are found in various localities throughout the world. The term "bituminous sand" is used herein to include those materials commonly referred to as oil sand, tar sand and the like. One of the most extensive deposits of bituminous sand occurs for instance, in the Athabasca District of the Province of Alberta, Canada.

Typically, the composition of these sands contain, by weight: from about 6% to about 20% of bitumen (also simply referred to herein as oil), from about 1% to about 10% of water, and from about 70% to about 90% of inorganic solids. The specific gravity of the bitumen (at 600° F.) varies from about 1.0 to about 1.05.

The major portion, by weight, of the inorganic solids in bituminous sand is fine grained quartz sand having a particle size greater than about 45 microns and less than 2,000 microns. For the most part, the remaining inorganic solid material has a particle size of less than about 45 microns and is referred to as fines. The fines contain clay and silt including some very small particles of sand. The fines content typically vary from about 10% to about 30% by weight of the total solid inorganic content of bituminous sand. However, it is not too uncommon for the bituminous sand composition to vary from the above mentioned ranges.

Various methods are known for separating bitumen from bituminous sand. These methods often involve the use of water for preparing a slurry at a temperature above about 125° F. Coarse sand and portions of the fines are separated from the slurry by various means such as settling or centrifuging to recover an emulsion which often contains a portion of the fines. Such an emulsion is simply referred to herein as a bituminous emulsion. Although the bituminous emulsion employed as the feed stock of this invention is not dependent on any particular technique in the water extraction of bituminous sand, one well known method for preparing such emulsions is often referred to as the "hot water method." In the hot water method the bituminous sand is jetted with steam or hot water and mulled with a small portion of water at about 175° F. and the pulp is then dropped into a turbulent stream of circulating water and carried through a separation cell maintained at an elevated temperature of about 180° F. In the separation cell entrained or rising streams of air cause the bitumen to rise to the top of the cell in the form of a froth. The froth contains air with the emulsion of bitumen, water and the fines. Optionally, the froth can be further treated such as by settling or washing, to separate part of the water and fines.

The bituminous emulsion, such as that obtained by the above described procedures, generally contains, by weight, from about 15% to about 60% water, 0% to about 15% fines and from about 30 to 85% bitumen. Usually, however, the bituminous emulsion or froth will contain by weight, from about 26% to about 45% water, about 3% to about 15% fines and 40% to 70% of bitumen. In addition to these three ingredients the emulsion also contains surfactants which are believed to be natural oxygenated degradation products of bitumen, or nitrogen and sulfur containing compounds found in tar sands.

Separation of water from the bituminous emulsion is necessary for most ultimate uses of the bitumen. However, the separation of water from such emulsions is extremely difficult. This is principally due to the presence of naturally occurring surfactants, the high surface tension and viscosity of bitumen and the substantial identity in specific gravity of water and bitumen.

A number of methods have been proposed for breaking bituminous emulsions. However, they suffer from various shortcomings such as incomplete separation or high cost. Such prior art methods include: (a) removing the solids (or water) by passing the emulsion through filters; (b) settling solids and water at elevated temperatures and pressure to reduce the viscosity of the system and to increase the breaking rate of the emulsion; (c) adding chemicals to reduce the interfacial tension of the system. Additionally it has been found that electrostatic precipitation methods which are effective in breaking many oil and water emulsions are ineffective when it is attempted to break a bituminous emulsion.

The bitumen from tar sands is generally of low API gravity, i.e., about 8.0 and contains relatively little material boiling in the distillate boiling range. In addition, the oil (bitumen) has a high content of organic sulfur and organic nitrogen compounds. Yields of motor fuel from these oils by conventional petroleum processes are comparatively poor. Extensive treating in refining operations are necessary to remove nitrogen, and/or sulfur and to obtain maximum yields of commercially desirable products from such crude oil.

It has now been found that water can be effectively separated from bituminous emulsions by a relatively mild hydrogenation of the emulsion. Further, such a mild hydrogenation serves as a convenient point for further hydrogenating and separating the bitumen to more useful products such as those having an API gravity above 15 or above 20. Hydrogenation of the bituminous emulsion of froth destroys many of the surfactants and reduces the specific gravity, viscosity and surface tension of the bitumen. Also it is believed that hydrogen sulfide released from hydrogenated sulfur compounds in the emulsion decreases the pH of the mixture which also tends to favor separation.

It is an object of this invention to provide a process for separating oil from bituminous emulsions and particularly emulsions occurring as froth.

It is another object of this invention to provide a process for simultaneously upgrading bitumen in the process of separating it from a bituminous emulsion by hydrogenation.

Further objects of this invention include a process for conveniently removing water from the products of a hydrogenated bituminous emulsion and a procedure for heating the bituminous emulsion to desired temperatures for hydrogenation without unduly fouling the piping and other equipment.

Other objects and advantages of this invention will become apparent to those skilled in the art as the description thereof proceeds.

Briefly, the process comprises feeding the products of a heated bituminous emulsion to a reactor maintained under suitable hydrogen pressure and reaction conditions for reacting hydrogen with such feed and particularly the bitumen when it is desired to effect hydrocracking in addition to merely breaking the emulsion. The major portion of the water vaporizes in the reactor whereas the bitumen remains in the liquid phase. During hydrogenation much of the surfactant content of the emulsion is destroyed. The oil is then separated from water by various techniques such as cooling the effluent from the reactor to a temperature below about 400° F. and flashing to reduced pressure.

The hydrogen which is supplied to the reaction system can be substantially pure hydrogen or of a gaseous stream containing other constituents such as carbon oxides, nitrogen, methane, ethane, and steam. The hydrogen containing gas introduced to the reaction zone is adjusted to provide sufficient hydrogen for reaction of about 600 s.c.f. per barrel of bitumen feed to about 1,500 s.c.f./b. of bitumen feed. Preferably, the hydrogen consumption for hydrocracking of the bitumen is from about 800 s.c.f./b. to 1,000 s.c.f./barrel of bitumen feed. When it is principally desired to merely make a separation of the emulsion into the oil and water phase with minimum cracking of the feed, the hydrogen consumption of the feed can vary from about 600 s.c.f. to about 800 s.c.f. per barrel of bitumen in the feed.

The hydrogen partial pressure in the reactor can vary over a wide range such as that from about 800 p.s.i.g. to 2,000 p.s.i.g. and preferably from about 1,000 p.s.i.g. to 1,500 p.s.i.g. The total pressure in the reactor will be substantially greater than that of hydrogen, particularly due to vaporization of water in the reactor although the total pressure preferably varies from about 1,000 p.s.i.g. to about 3,500 p.s.i.g. The temperature in the reactor can vary from about 700° F. to about 900° F. and preferably from about 775° F. to about 880° F. Since water is the more easily vaporized major constituent of the feed and for the most part vaporizes in the reactor, the lower and intermediate portions of the reactor are enriched with oil.

Hydrogenation of the bitumen is in the liquid phase, preferably without the addition of a catalyst. However, conventional hydrogenation catalysts can be employed. Illustrative of hydrogenation catalysts there can be mentioned: the oxides of cobalt and molybdenum on alumina; molybdenum oxide on alumina; and oxides of nickel and tungsten on alumina. When it is desired to employ a hydrogenation catalyst it is preferred that the hydrogenation be conducted by the ebullated technique such as heat described in U.S. Patent 2,987,465, which issued to E. S. Johanson on June 6, 1961.

After hydrogenation the water is separated from the oil by cooling and flashing the effluent. Water can then be recovered as overhead vapor or condensed as a bottom liquid layer, depending on temperature and pressure of the effluent. However, a combination of these separation procedures can be employed.

Referring now more particularly to the drawing wherein identical numerals refer to identical parts, a bituminous emulsion froth of 5,000 barrels per hour of bitumen (42 U.S. gallons per barrel with bitumen of a specific gravity of 1.02), 651,000 lbs. per hour of water and 149,000 lbs. per hour of fines are fed through pump 10 into line 11. The feed is joined with hydrogen from line 52 and the mixture of hydrogen and feed proceeds through line 12 and to heat exchanger 14 where the temperature of the mixture is brought up to 174° F. The heated mixture then passes into line 15 and then to heat exchanger 16 where the temperature is raised to about 727° F. and thence through line 17 into furnace 18 which raises the temperature of the feed 805° F. prior to entering the reactor 20 through line 19. The hydrogen partial pressure in reactor 20 is about 1,100 p.s.i.g. and the temperature is maintained at approximately 852° F. After reaction of about 1,000 s.c.f. of hydrogen per barrel of the bitumen the effluent hydrotreated product, water, fines and unreacted hydrogen pass from the reactor 20 through line 22, heat exchanger 16 where the temperature of the effluent is reduced to 318° F. prior to passage through line 24 from which it is subsequently flashed into separator 26. The flashed effluent separates into a water layer at the bottom of vessel 26 which is drawn off by valve 28 and a liquid hydrocarbon layer above the water which is drawn off through line 60. Water vapor with small quantities of hydrocarbon are drawn off through the top of separator 26 and through line 32 into heat exchanger 34 where the vapors are cooled to about 85° F. and flashed into vessel 35 from line 36. Water collects in the bottom of vessel 35 and is drawn off through valve 40 whereas hydrogen is removed overhead through line 44 and passed into separator 46 and line 48 for recirculation by pump 50. A small amount of oil is recovered from separator 46 through line 63. Fresh hydrogen is also admitted into the system through pump 50 and line 52. Hydrocarbon vapors condense in vessel 35 and form an intermediate layer above the water and are passed by line 62 into line 60 which carries the separated hydrocarbon (oil) and fines.

Intermediate the top and bottom of vessel 26 hydrocarbon oil is removed by line 60 and is joined by additional hydrocarbon oil through lines 62 and 63. The total hydrocarbon oil removed by this example can have an API gravity of about 25.

Since the feedstock contains various organic and inorganic matter in addition to large quantities of water it is preferred that the final heating of the bituminous emulsion feedstock be effected by recirculating heated product instead of directly in furnace 18 since the heating tubes in the furnace in contact with the emulsion become fouled and clogged by the feedstock. Thus, in a preferred embodiment of the invention furnace 18 merely acts as a part of the conduit for the feedstock from line 17 without supplying any heat. Instead, valve 80 to line 19 and valve 82 to line 84 are opened and substantially dry hydrocarbon from the liquid hydrocarbon layer of furnace 20 passes through valve 82, line 84, pump 86 and line 88, into furnace 90. The recirculated oil is heated sufficiently in furnace 90 to raise the temperature of the feedstock in line 19 to about 805° F. prior to its entry in line 92 and valve 80 to join the feed in line 19 for passage to reactor 20.

What is claimed is:

1. A process for separating hydrocarbons from bituminous sand which comprises mixing bituminous sand with water at a temperature above 125° F. to form a slurry, separating sand from said slurry and recovering a bituminous emulsion feedstock containing bitumen and from about 15 to about 60 weight percent water, heating said feedstock to a temperature of 700° F. to 900° F. and contacting the heated feedstock with hydrogen at a partial pressure of from 800 p.s.i.g. to 2,000 p.s.i.g. in a reacting zone and reacting from 600 to 1,000 s.c.f. of hydrogen per barrel of bitumen feed.

2. The process of claim 1 wherein said emulsion contains by weight from about 3% to 15% of fines.

3. A process for recovering hydrocarbons from a water and oil emulsion which comprises (a) heating an emulsion of bitumen and water obtained from a tar sand aqueous slurry to obtain a heated feedstock of said emulsion; (b) comprising by weight, from about 15% to 60% water, 30% to 85% bitumen having a specific gravity of from about 1.0 to 1.05 and 0% to about 15% of fines; (c) contacting the heated feed with hydrogen in a reaction zone at a temperature from about 700° F. to 900° F. and hydrogen partial pressure from about 800 to 2,000 p.s.i.g.; and (d) from about 600 to 1,500 s.c.f. of hydrogen with the feed per barrel of bitumen.

4. The process of claim 3 in which the emulsion of step (b) contains between about 3 and about 15 weight percent fines.

5. A process for separating hydrocarbons from bituminous sand which comprises mixing bituminous sand with water at a temperature above 125° F. to form a slurry, treating said slurry to separate sand and a bituminous emulsion, said emulsion containing by weight from about 26% to about 45% water, about 3% to about 15% fines and from about 40% to 70% of bitumen, said bitumen having a specific gravity of from about 1.0 to 1.05, heating said emulsion to a temperature of 775° F. to 880° F. and hydrogenating the heated bitumen containing liquid at about 800 p.s.i.g. to 1,000 p.s.i.g. and reacting from 800 s.c.f. to 1,000 s.c.f. of hydrogen per barrel of bitumen in the feed, removing hydrogenated effluent containing hydrocarbon oils, water and fines from the reactor, cooling and reducing the pressure on the effluent to form a two phase liquid having a hydrocarbon phase above a bottom water layer, and separating the hydrocarbon and water phases.

6. A process for treating a water and oil emulsion which which comprises passing a feedstock of a bituminous emulsion containing bitumen and from about 15 to about 60 weight percent water into a hydrogenation zone, in said hydrogenation zone contacting said feed with hydrogen under suitable hydrogenating conditions to thereby break the emulsion, hydrogenate the bitumen and vaporize at least a major portion of the water.

7. A process for recovering hydrocarbons from bituminous sand which comprises mixing bituminous sand with water at a temperature above 124° F. to form an aqueous slurry, recovering from said slurry a bituminous emulsion feedstock containing substantial quantities of from about 15 to about 60 weight percent water and from about 30 to about 85 weight percent bitumen, heating said feedstock to a temperature between about 700° F. and about 900° F., contacting the heated feedstock with hydrogen at a partial hydrogen pressure of between about 800 and about 2,000 p.s.i.g. and recovering hydrogenated and dehydrated bitumen as a product of the process.

8. A process for simultaneously hydrocracking and dehydrating an emulsion which comprises feeding a frothy bituminous emulsion containing by weight, from about 15% to 60% water, about 3% to 15% fines and about 40% to 70% of bitumen into a hydrogenation reaction zone and reacting a sufficient quantity of hydrogen therewith at a temperature and pressure sufficient to substantially raise the API gravity of said bitumen while vaporizing at least a major portion of said water and removing and cooling the effluent from the hydrogenation zone to form an upper hydrocarbon layer and a lower water layer.

References Cited by the Examiner

UNITED STATES PATENTS

| | | | |
|---|---|---|---|
| 3,044,948 | 7/1962 | Eastman et al. | 208—11 |
| 3,151,054 | 9/1964 | Layng | 208—11 |
| 3,151,057 | 9/1964 | Schumen et al. | 208—11 |
| 3,159,562 | 12/1964 | Richard et al. | 208—11 |

OTHER REFERENCES

Report on the Alberta Bituminous Sands by S. M. Blair, December 1950, Gov't. of Edmonton, Alberta, Canada (pp. 30–31).

DANIEL E. WYMAN, *Primary Examiner.*

P. KONOPKA, *Assistant Examiner.*